(12) United States Patent (10) Patent No.: US 7,950,101 B2
Kim (45) Date of Patent: May 31, 2011

(54) ADAPTOR OF WIPER BLADE

(75) Inventor: In Kyu Kim, Gyeonggi-do (KR)

(73) Assignees: ADM21 Co., Ltd., Gyeonggi-do (KR); In-Kyu Kim, Gyeonggi-do (KR)

( * ) Notice: Subject to any disclaimer, the term of this patent is extended or adjusted under 35 U.S.C. 154(b) by 934 days.

(21) Appl. No.: 11/760,611

(22) Filed: Jun. 8, 2007

(65) Prior Publication Data

US 2008/0086830 A1 Apr. 17, 2008

(30) Foreign Application Priority Data

Oct. 12, 2006 (KR) .................... 20-2006-0027749 U
Mar. 8, 2007 (KR) .................... 20-2007-0003864 U

(51) Int. Cl.
*B60S 1/40* (2006.01)
(52) U.S. Cl. ...................... 15/250.32; 403/321; 403/329
(58) Field of Classification Search ................ 15/250.32, 15/250.31, 250.44, 250.43; 403/321, 329
See application file for complete search history.

(56) References Cited

U.S. PATENT DOCUMENTS

| | | | |
|---|---|---|---|
| 5,746,534 A * | 5/1998 | Hara ............................. | 403/133 |
| 5,885,023 A * | 3/1999 | Witek et al. .................. | 403/321 |
| 5,920,950 A * | 7/1999 | Young et al. ................ | 15/250.32 |
| 6,779,223 B1 | 8/2004 | Roekens | |
| 2002/0174505 A1 * | 11/2002 | Kim .......................... | 15/250.32 |
| 2004/0123414 A1 | 7/2004 | Lee | |
| 2005/0028312 A1 | 2/2005 | Coughlin | |

FOREIGN PATENT DOCUMENTS

| | | |
|---|---|---|
| EP | 0528307 A1 | 2/1993 |
| FR | 2731191 A1 | 9/1996 |
| FR | 2848955 A1 | 6/2004 |
| GB | 2324463 A | 10/1998 |
| JP | 10181540 A | 7/1998 |
| KR | 20327354 | 9/2003 |
| KR | 1020060134912 A | 12/2006 |
| KR | 20-2007-0003864 | 9/2008 |

* cited by examiner

*Primary Examiner* — Gary K Graham
(74) *Attorney, Agent, or Firm* — Seed IP Law Group PLLC

(57) ABSTRACT

The present invention relates to an adaptor of a wiper blade with an improved structure for allowing the wiper blade to be easily coupled to wiper arms with a variety of shapes and sizes upon exchange of the wiper blade. There is provided an adaptor coupled to a bracket of a wiper blade for coupling the wiper blade to a wiper arm, which includes a base body formed with a coupling groove portion to be coupled to the bracket, and a pair of base sidewalls coupled integrally with each other by the base body. Further, the base body includes a first elastic support extending from the coupling groove portion in one direction and a second elastic support spaced apart from the first support by a certain distance, and each of the pair of base sidewalls is formed with a through hole therein.

19 Claims, 11 Drawing Sheets

(a)

(b)

(a)

(b)

ADAPTOR OF WIPER BLADE

BACKGROUND

1. Technical Field

The present invention relates to an adaptor of a wiper blade for coupling a wiper blade for wiping a windshield of a vehicle to a wiper arm, and more particularly, to an adaptor of a wiper blade with an improved structure for allowing the wiper blade to be conveniently coupled to a variety of wiper arms.

2. Description of the Related Art

In general, if a windshield of a vehicle is contaminated with dust in an atmosphere, rain or snow, the driver's visibility is obscure and thus the safe driving is disturbed. Therefore, in order to secure the visibility required for the driver's safe driving, a wiper apparatus for driving a wiper blade brought into contact with a windshield to wipe a windshield is provided.

A general wiper apparatus comprises a wiper arm which is swiveled repeatedly within a predetermined angular range by a motor mounted fixedly to a vehicle body and a wiper blade which is coupled to the wiper arm and swiveled to wipe a windshield.

A wiper blade comprises a frame constituting a plurality of link structures, a wiper strip which is made of a rubber material and coupled to the frame to come into resilient contact with a windshield of a vehicle, and an adaptor coupled to a bracket formed on the frame to couple the wiper blade to the wiper arm.

Such a wiper blade is expendable supplies, i.e., it can be replaced with a new one for the next use when a wiper strip made of a rubber material is worn out or has lower contact or washing performance due to the repeated usage. A wiper blade is generally sold in a package in a state where it is coupled with an adaptor. Therefore, when a user intends to replace a wiper blade with a new one, a wiper blade assembly including an adaptor should be replaced as a whole.

However, since the adaptor has been already coupled to a bracket of the wiper blade, the adaptor cannot be elastically deformed. Accordingly, when a user intends to couple the conventional wiper blade to the wiper arm, the adaptor should be swiveled at a certain angle to fit a ring portion of the wiper arm into the adaptor at an inclined angle and thus to couple the wiper blade to the wiper arm. Thus, a process of coupling the wiper blade to the wiper arm is very inconvenient and troublesome.

In the meantime, a wiper arm is classified into a hook type wiper arm, a side pin type wiper arm, a bayonet type wiper arm and the like, according to shapes of a coupled portion thereof with the adaptor.

However, the shape and size of the adaptor to be coupled with the wiper arm should be changed according to the shape and size of the wiper arm. Thus, there is a problem in that the adaptors corresponding to various shapes and sizes of the wiper arms should be manufactured, purchased and procured additionally upon the manufacture of the wiper blades.

Accordingly, there is a need for an adaptor of a wiper blade with an improved structure for allowing the wiper blade to be easily coupled to wiper arms with a variety of shapes and sizes upon exchange of the wiper blade.

BRIEF SUMMARY

According to one embodiment, there is provided an adaptor coupled to a bracket of a wiper blade for coupling the wiper blade to a wiper arm, which comprises a base body formed with a coupling groove portion to be coupled to the bracket, and a pair of base sidewalls coupled integrally with each other by the base body. Further, the base body may include a first elastic support extending from the coupling groove portion in one direction and a second elastic support spaced apart from the first support by a certain distance, and each of the pair of base sidewalls may be formed with a through hole therein.

Here, the first support may include a pressing portion which is formed on a distal end thereof and is elastically deformed to press and support the wiper arm when the pressing portion is brought into contact with the wiper arm. The second support may include upper and lower protrusion which protrudes upwardly and downwardly, respectively. The through hole formed in the base sidewall may be provided with an upper guide formed along a portion of an outer periphery thereof to guide the coupling of the wiper blade to the wiper arm.

When the hook type wiper arm is coupled to the adaptor, a ring portion of the wiper arm may be brought into contact with an inner surface of the base sidewall, the upper guide formed integrally on the base sidewall, the coupling groove portion formed integrally in the base body, the pressing portion of the first support, and the upper protrusion of the second support, whereby the wiper arm can be maintained at a fixed state.

Alternatively, when the hook type wiper arm is coupled to the adaptor, a ring portion of the wiper arm may be brought into contact with an inner surface of the base sidewall, the upper guide formed integrally on the base sidewall, the coupling groove portion formed integrally in the base body, the pressing portion of the first support, and the lower protrusion of the second support, whereby the wiper arm can be maintained at a fixed state.

Further, when the side pin type wiper arm is coupled to the adaptor, a side pin may be inserted through the through holes formed in the base sidewalls and is then elastically supported by the first support formed integrally on the base body, whereby the wiper arm can be maintained at a fixed state.

The base body may include a lower guide formed a distal end of the base sidewall at a position spaced downwardly from the second support by a certain distance.

The base sidewall may include a bulged portion which is gently bulged from an inner surface thereof.

Alternatively, the base sidewall may include a protrusion protruding from an outer surface thereof at an upper end of the outer surface to restrict a rotating range of the wiper blade.

In addition, the base sidewall may include a plurality of circular protrusions formed on an outer surface thereof in a concentric circular pattern around the coupling groove portion.

The adaptor of the present invention may further comprise a cover member additionally mounted to the adaptor. The cover member may include a pair of cover sidewalls each of which is formed with a coupling protrusion inserted and coupled into the through hole formed on the base sidewall of the adaptor, and a cover body for integrally coupling the pair of cover sidewalls to each other.

Here, the cover body may include an insertion groove portion open in one direction and a hooking portion extending to the other direction to be hooked to an outer periphery of the coupling groove portion of the adaptor.

Preferably, the cover member is coupled to the adaptor in a state where the coupling protrusion formed on the cover sidewall is inserted into the through hole, the hooking portion of the cover body is hooked to the outer periphery of the coupling groove portion, and the insertion groove portion of the cover body presses and elastically deforms the first support.

When a bayonet type wiper arm is coupled to the adaptor with the cover member installed thereto, the wiper arm may be inserted into the insertion groove portion and be maintained at a fixed state.

According to another embodiment, there is provided an adaptor coupled to a bracket of a wiper blade for coupling the wiper blade to a wiper arm, which comprises a base member coupled to the wiper blade, and a cover member mounted to the base member. Further, the base member may include a base body formed with a coupling groove portion to be coupled with the bracket and having a first elastic support extending from the coupling groove portion in one direction, and a pair of base sidewalls coupled with each other by the base body and each having a through hole, and the cover member may include a pair of cover sidewalls each of which is formed with a coupling protrusion inserted and coupled into the through hole formed on the base sidewall of the adaptor, and a cover body for integrally coupling the pair of cover sidewalls to each other.

The first support may include a pressing portion which is formed on a distal end thereof and may be elastically deformed to press and support the wiper arm when the pressing portion is brought into contact with the wiper arm.

The base sidewall may include an upper guide formed along a portion of an outer periphery of the through hole to guide the coupling of the cover body to the base member, and the cover body may include an insertion groove portion open in one direction to receive the wiper arm therein and a hooking portion hooked to an outer periphery of the coupling groove portion of the base body.

The base sidewall may include a bulged portion which is gently bulged from an inner surface thereof.

Further, the base sidewall may include a protrusion protruding from an outer surface thereof at an upper end of the outer surface to restrict a rotating range of the wiper blade.

Furthermore, the base sidewall may include a plurality of circular protrusions formed on an outer surface thereof in a concentric circular pattern around the coupling groove portion.

DETAILED DESCRIPTION

Hereinafter, preferred embodiments of the present invention will be described in more detail with reference to the accompanying drawings.

Figure 1:
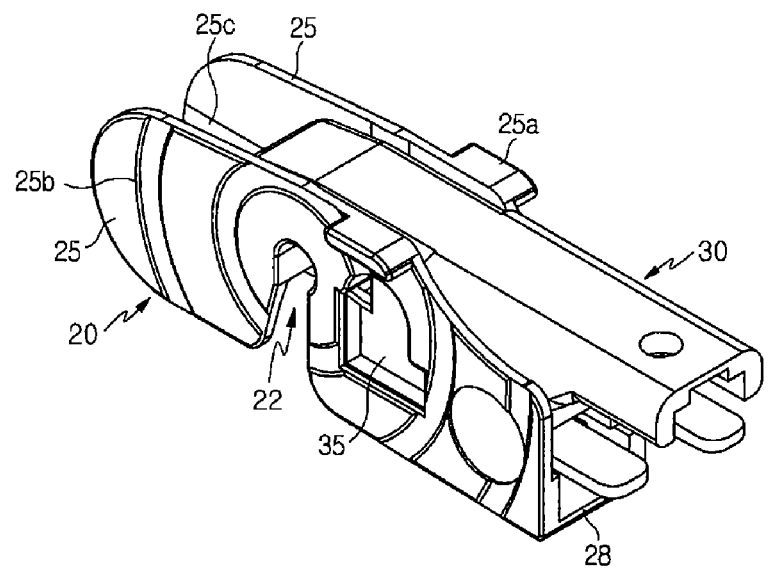
FIG. 1 is a perspective view showing an adaptor of a wiper blade according to one embodiment.
Figure 3:
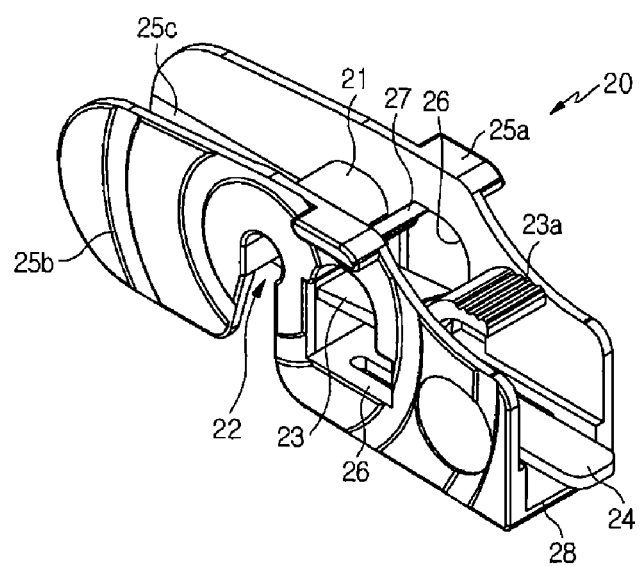
FIG. 3 is a perspective view showing a base member of an adaptor according to one embodiment.
Figure 2:
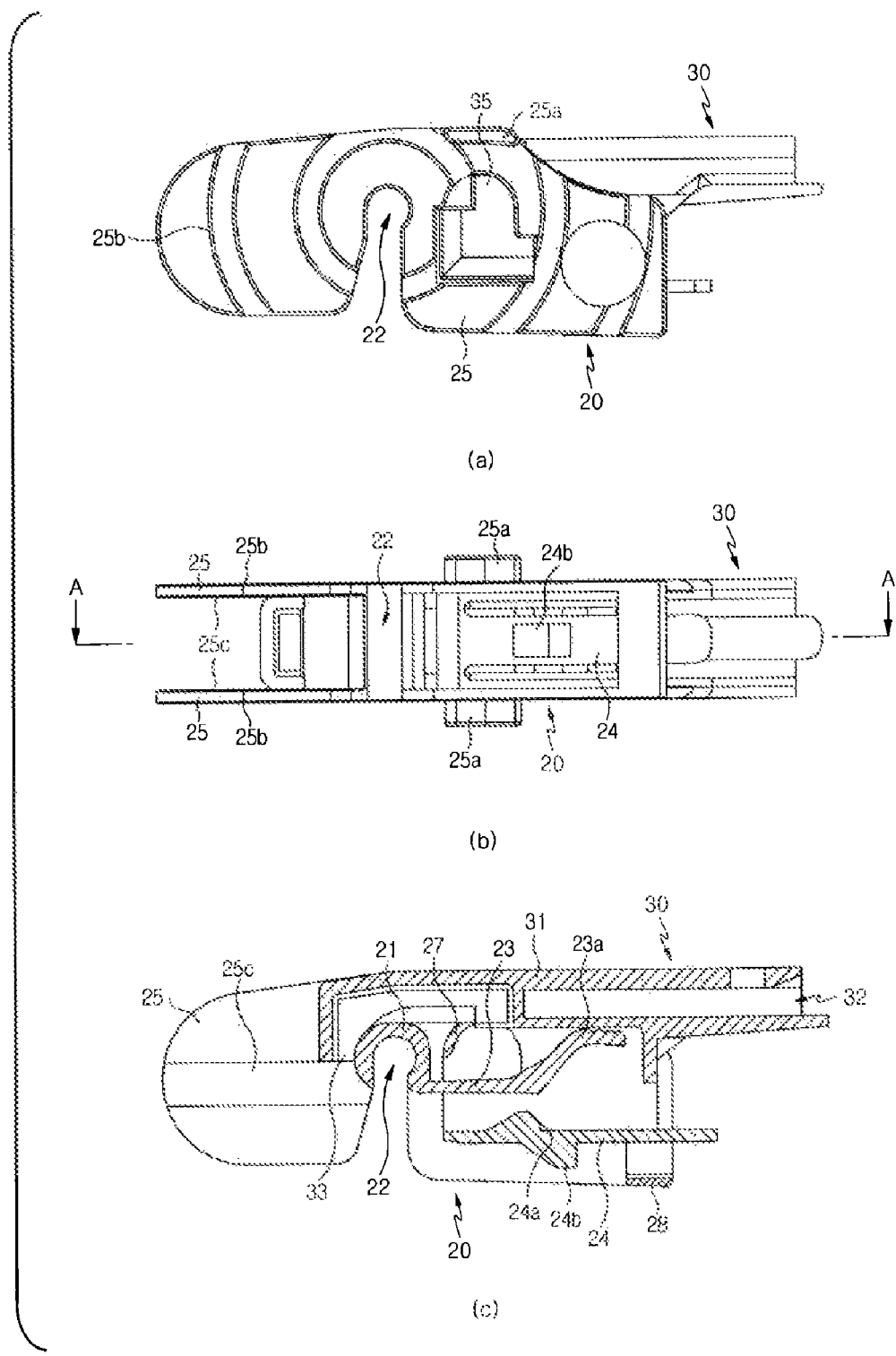
FIG. 2 is a view showing an adaptor of a wiper blade according to one embodiment, in which (a) is a front view, (b) is a bottom view, and (c) is a sectional view taken along line A-A in FIG. 2(*b*)
Figure 4:
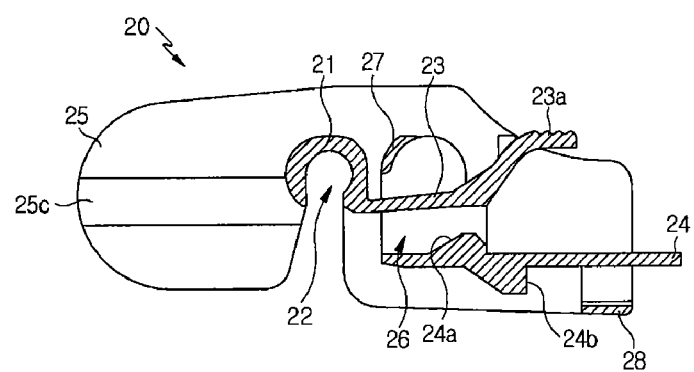
FIG. 4 is a sectional view of the base member of FIG. 3.
Figure 5:
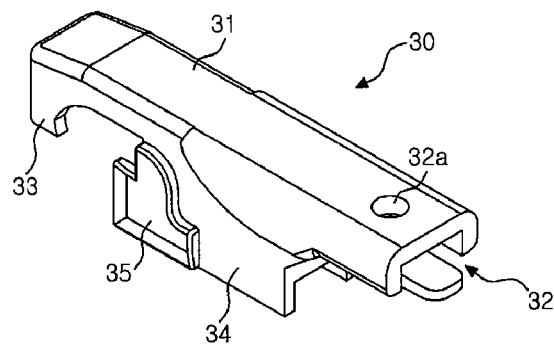
FIG. 5 is a perspective view showing a cover member of an adaptor according to one embodiment.
Figure 6:
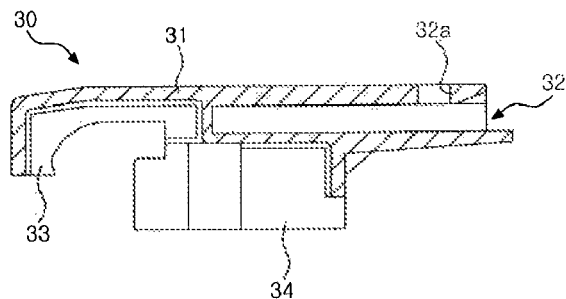
FIG. 6 is a sectional view of the cover member of FIG. 5.

FIGS. 1 and 2 show an adaptor of a wiper blade according to one embodiment in an assembled state; FIGS. 3 and 4 show a base member of the adaptor; and FIGS. 5 and 6 show a cover member of the adaptor.

Further, FIGS. 7 to 14 are views illustrating a state where the adaptor is coupled to a hook type wiper arm, another hook type wiper arm, a side pin type wiper arm or a bayonet type wiper arm.

As shown in FIGS. 1 to 6, an adaptor of a wiper blade according to one embodiment comprises a base member 20 which is configured to be coupled to a wiper blade, and a cover member 30 which is mounted to the base member 20, if necessary.

As shown in FIGS. 3 and 4, the base member 20 includes a base body 21 which defines a coupling groove portion 22 configured to be coupled to a coupling rod (not shown) formed on a bracket of the wiper blade, and a pair of base sidewalls 25 which are coupled integrally with each other by the base body 21.

The base body 21 includes a first elastic support 23 extending from the coupling groove portion 22 in a direction (in a rightward direction as viewed from FIG. 4), and a second elastic support 24 spaced downwardly from the first support 23 by a certain distance.

Toward a distal end of the first support 23 there is formed a pressing portion 23*a* which may extend obliquely in a right upper direction (as viewed from FIG. 4) and come into contact with the cover member 30 or various kinds of wiper arms to press and support them as described later.

Further, the second support 24 includes upper and lower protrusions 24a and 24b, each of which takes the shape of a wedge. In one embodiment the upper and lower protrusions 24a and 24b are formed on top and bottom surfaces of the second support 24, respectively.

Each of the pair of base sidewalls 25 has a through hole 26 through which a side pin type wiper arm (which will be described later) can be coupled. Further, an upper guide 27 formed along a portion of an upper periphery of the through hole 26 to guide the coupling of a hook type wiper arm (which will be described later) and an inelastic lower guide 28 formed at a distal end of the base sidewall 25 and spaced downwardly from the second support 24 by a certain distance are formed to connect a pair of the base sidewalls 25 with each other.

As described later in one embodiment, the first and second supports 23 and 24 cause hook type wiper arms 11 and 13 to be fixed in cooperation with the base sidewalls 25, the upper and lower guides 27 and 28 formed integrally with the base sidewalls 25, and the like.

Further, in one embodiment, the first support 23 causes a side pin type wiper arm 15 to be fixed in cooperation with the base sidewalls 25, the through holes 26 formed in the base sidewalls 25, and the like.

In one embodiment, a projection 25a and a circular protrusion 25b are formed on an outer surface of the base sidewall 25, as shown in FIGS. 1, 2 (a) and 3. The projection 25a protrudes outwardly from an upper end on the outer surface of the base sidewall 25 to restrict an operation range of the wiper blade, so that the wiper blade can be rotated within a predetermined range when the base member 20 is coupled with the wiper blade. A plurality of circular protrusions 25b are formed on the outer surface of the base sidewall 25 in a concentric circular pattern around the coupling groove portion 22 to reduce a contact area between the base sidewall 25 and the wiper blade, which are coupled with each other, such that the wiper blade can be rotated within the predetermined range as described above. Therefore, a friction between the base sidewall and the wiper blade is inhibited to allow the wiper blade to be freely rotated within the predetermined range.

As shown in FIGS. 5 and 6, the cover member 30 includes a pair of cover sidewalls 34 each of which is formed with a coupling projection 35 inserted and coupled into the through hole 26 of the base member 20, and a cover body 31 for allowing the pair of cover sidewalls 34 to be integrally coupled to each other.

In one embodiment, the cover body 31 has an insertion groove portion 32 which is open in one direction (in a rightward direction as viewed in FIG. 6) to allow the bayonet type wiper to be inserted therein and coupled thereto as described later, and a hooking portion 33 which extends in the other direction (in a leftward direction as viewed in FIG. 6) to be hooked to the base body 21 of the base member 20, i.e., an outer periphery of the coupling groove portion 22.

Referring again to FIGS. 1 and 2, the cover member 30 is inserted between both base sidewalls 25 of the base member 20 and is then coupled with the base member 20. That is, the cover member 30 is inserted and coupled into the base member 20 in such a manner that the outer surfaces of the cover sidewalls 34 of the cover member 30 are positioned adjacent to, or brought into close contact with, the inner surfaces of the base sidewalls 25 of the base member 20.

The coupling projections 35 formed on the cover sidewalls 34 are inserted into the through holes 26 formed in the base sidewalls 25, respectively, and the hooking portion 33 of the cover body 31 is hooked with the outer periphery of the coupling groove portion 22 of the base member 21. Further, the insertion groove portion 32 of the cover body 31 presses downward the first support 23 of the base member 21 such that the first support 23 can be maintained at an elastically deformed state.

Hereinafter, a structure by which various kinds of wiper arms 11, 13, 15 and 17 can be coupled to an adaptor of a wiper blade according to embodiments discussed herein will be illustrated with reference to FIGS. 7 to 14.

Figure 8:
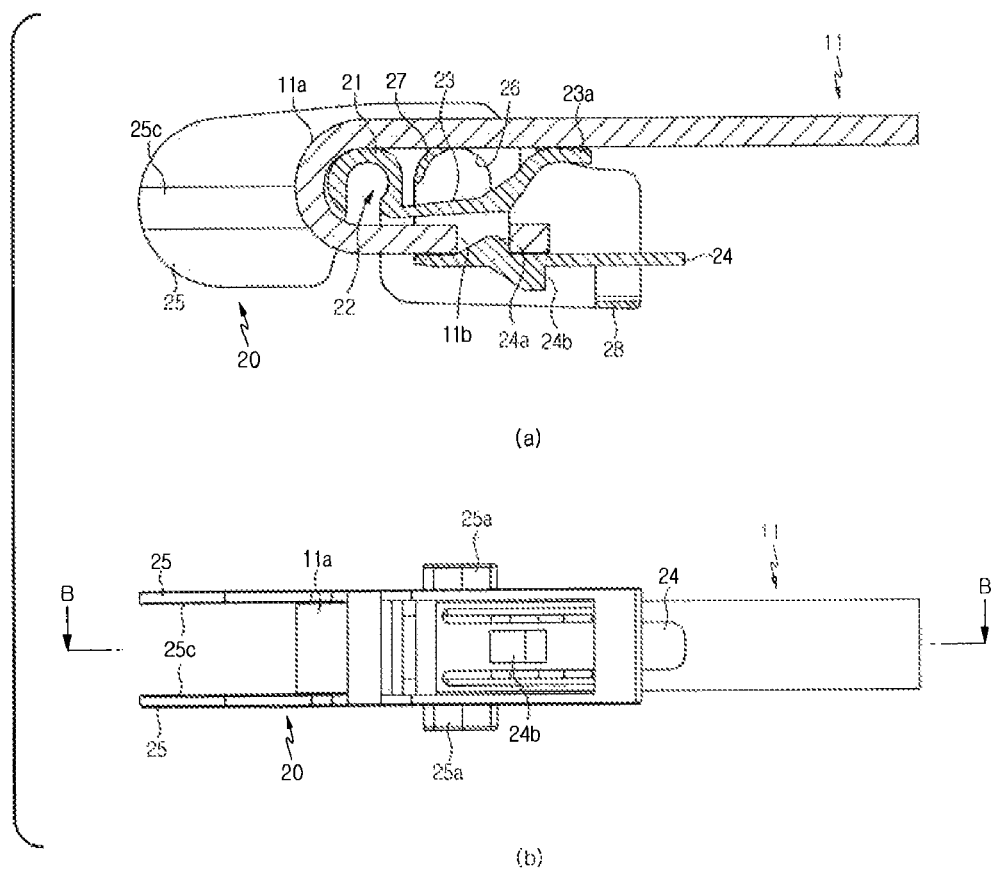
FIG. 8 is a view illustrating a state where an adaptor of a wiper blade according to one embodiment is coupled to a hook type wiper arm of FIG. 7, in which (a) is a sectional view taken along line B-B in FIG. 8(*b*) and (b) is a bottom view showing a coupled state.
Figure 7:
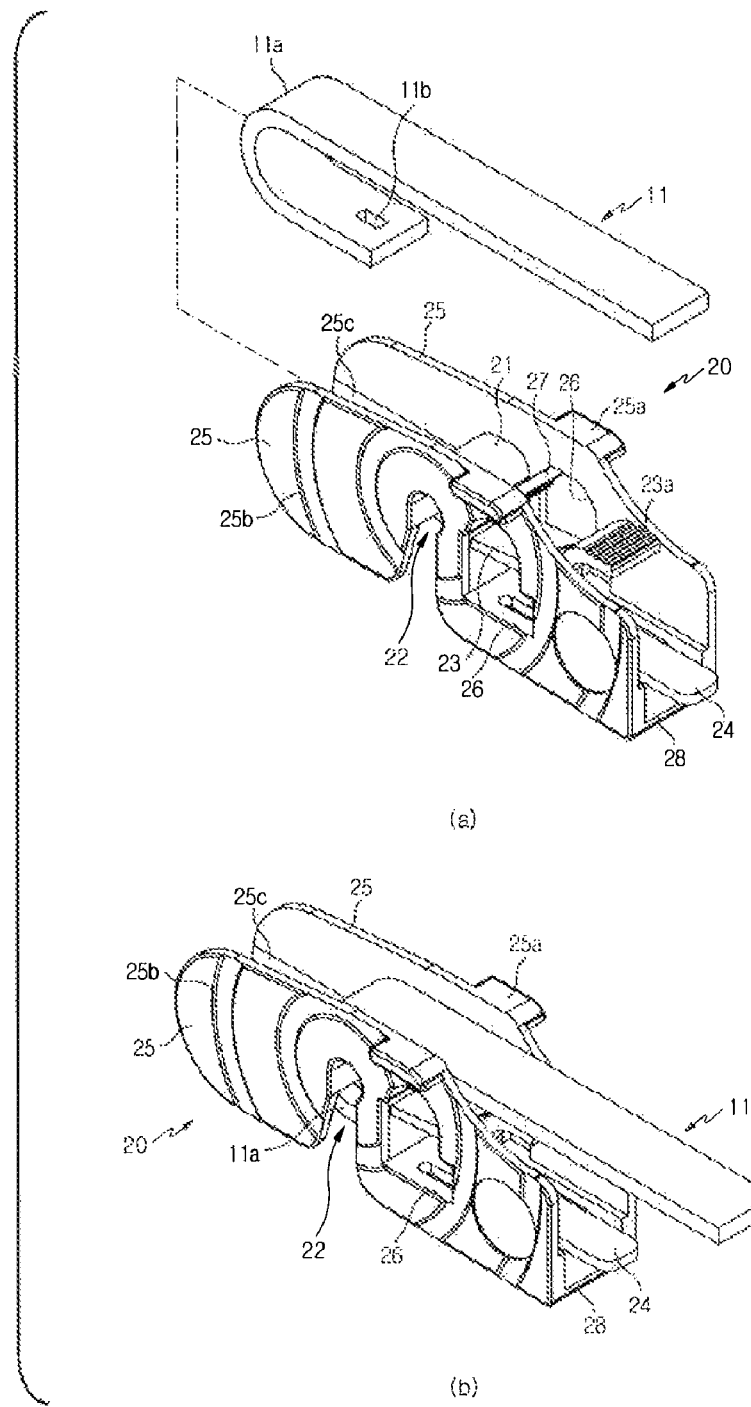
FIG. 7 is a view illustrating a state where an adaptor of a wiper blade according to one embodiment is coupled to a hook type wiper arm, in which (a) is a perspective view showing an uncoupled state and (b) is a perspective view showing a coupled state.

FIGS. 7 and 8 are views illustrating a state where an adaptor of a wiper blade according to one embodiment is coupled to the hook type wiper arm. As indicated by a dotted line in FIG. 7a, the hook type wiper arm 11 can be moved in a direction parallel with the adaptor and then be coupled to the adaptor in a state as illustrated in FIG. 7(b).

As shown in FIG. 8, when the hook type wiper arm 11 is coupled to the adaptor including only the base member 20 without the cover member 30, a ring portion 11a of the wiper arm 11 is brought into contact with the adaptor, i.e., an inner surface of the base sidewall 25 of the base member 20, the upper guide 27 formed integrally on the base sidewall 25, the coupling groove portion 22 formed integrally in the base body 21 of the base member 20, the pressing portion 23a of the first support 23, the upper protrusion 24a of the second support 24, and the like. Therefore, the wiper arm 11 can be kept at a fixed state.

In particular, since the upper protrusion 24a of the second support 24 formed integrally on the base body 21 is inserted into a coupling hole 11b formed in the ring portion 11a of the hook type wiper arm 11, the hook type wiper arm 11 can be further firmly fixed to the adaptor.

Further, a bulged portion 25c which is gently bulged inwardly is formed on an inner surface of the base sidewall 25. Accordingly, when the base member 20 and the wiper arm 11 are coupled with each other, they can be further firmly brought into close contact with each other to reduce an operating vibration of the wiper blade and to reduce the difficulty of the coupling/uncoupling process due to the excessive friction.

Figure 9:
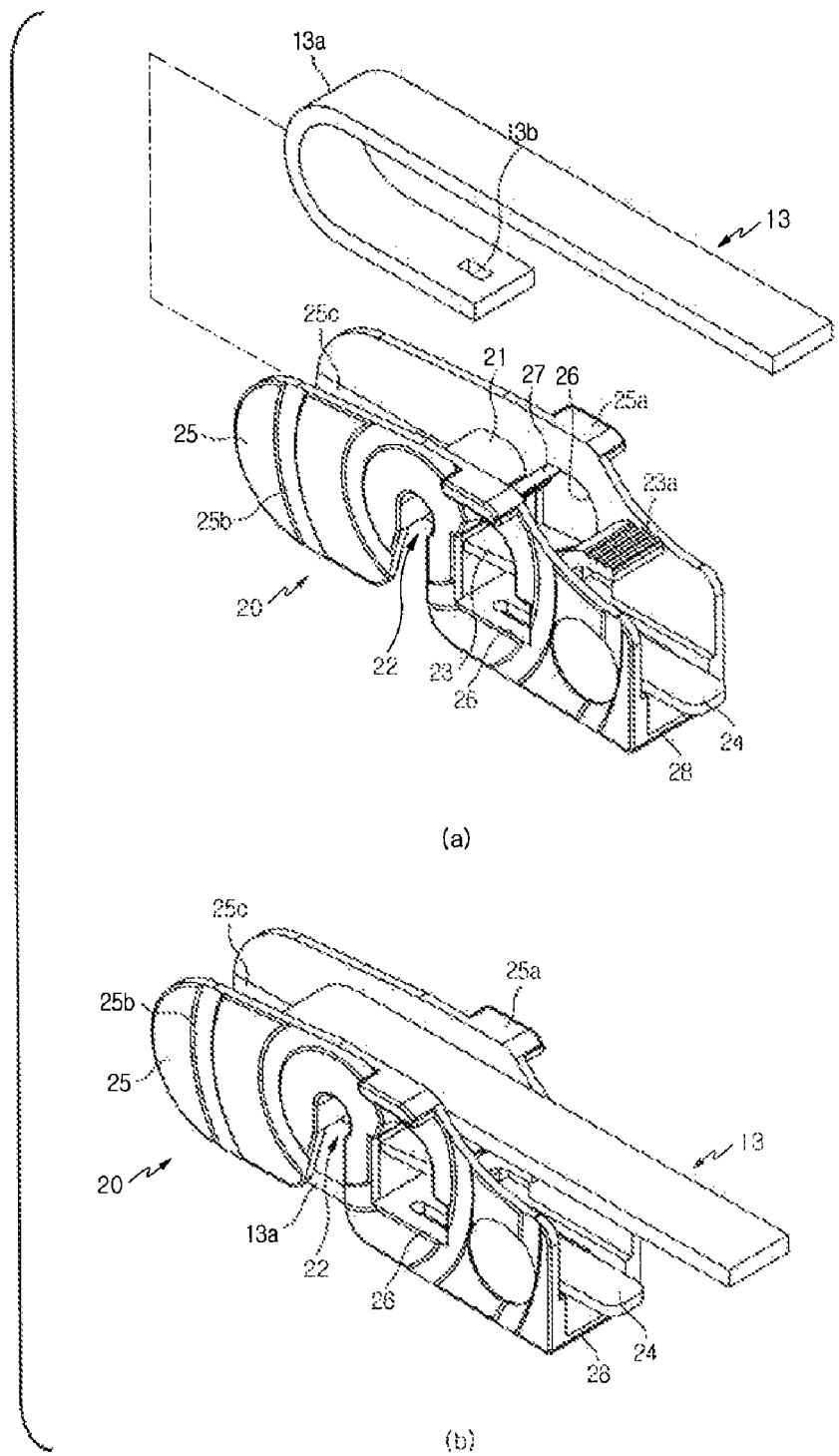
FIG. 9 is a view illustrating a state where an adaptor of a wiper blade according to one embodiment is coupled to another hook type wiper arm, in which (a) is a perspective view showing an uncoupled state and (b) is a perspective view showing a coupled state.
Figure 10:
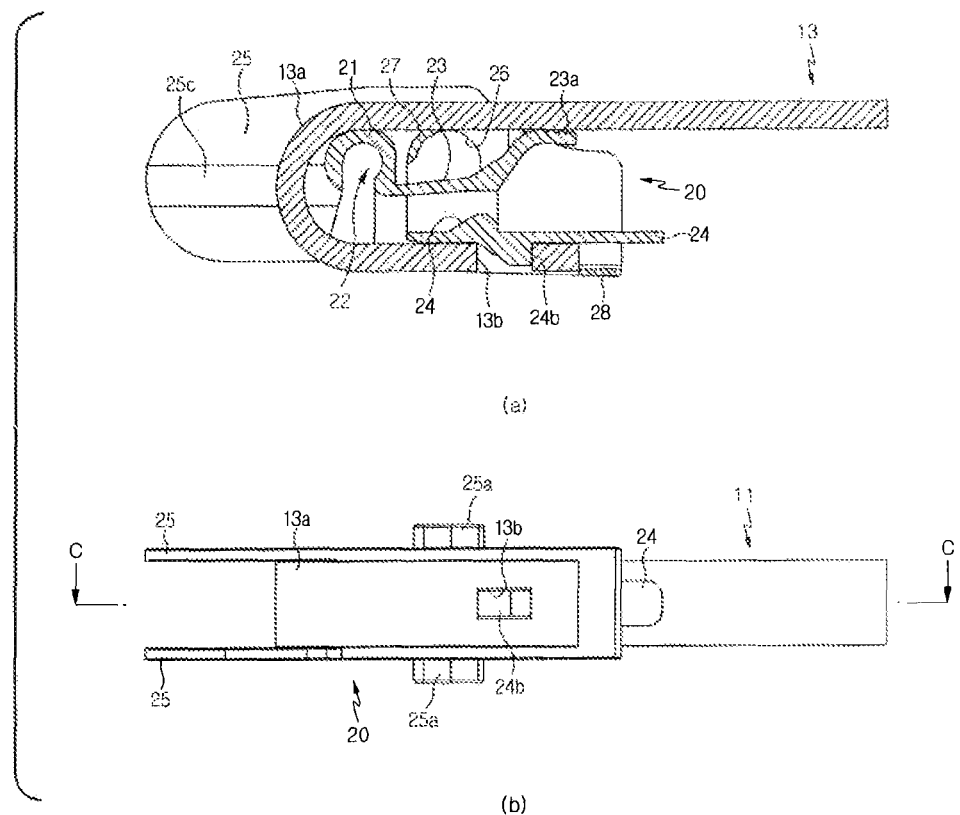
FIG. 10 is a view illustrating a state where an adaptor of a wiper blade according to one embodiment is coupled to another hook type wiper arm of FIG. 9, in which (a) is a plan view showing a coupled state and (b) is a sectional view taken along line C-C in FIG. 10(*a*)

FIGS. 9 and 10 are views illustrating a state where an adaptor of a wiper blade according to one embodiment is coupled to another hook type wiper arm. The hook type wiper arm 13 of FIGS. 9 and 10 has a greater radius of the ring portion and a longer length than those of the hook type wiper arm 11 of FIGS. 7 and 8. As indicated by a dotted line in FIG. 9(a), the hook type wiper arm 13 can be moved in a direction parallel with the adaptor and then coupled to the adaptor in a state as shown in FIG. 9(b).

As shown in FIG. 10, when the hook type wiper arm 13 is coupled to the adaptor including only the base member 20 without the cover member 30, a ring portion 13a of the wiper arm 13 is positioned adjacent, or brought into contact with, the adaptor, i.e., the inner surface of the base sidewall 25 of the base member 20, the upper and lower guides 27 and 28 formed integrally on the base sidewall 25, the coupling groove portion 22 formed integrally in the base body 21 of the base member 20, the pressing portion 23a of the first support 23, the lower protrusion 24b of the second support 24, and the like. Therefore, the wiper arm 13 can be kept at a fixed state.

In particular, since the lower protrusion 24b of the second support 24 formed integrally on the base body 21 is inserted into the coupling hole 11b formed in the ring section 13a of the hook type wiper arm 13 and a distal end of the wiper arm 13 is also positioned adjacent, or brought into contact with, the lower guide 28 as shown in FIG. 10 (a), the hook type wiper arm 13 can be more stably and firmly fixed to the adaptor.

Further, a bulged portion 25c which is gently bulged inwardly is formed on the inner surface of the base sidewall 25. Accordingly, when the base member 20 and the wiper arm 13 are coupled with each other, they can be further firmly brought into close contact with each other to reduce an operating vibration of the wiper blade and to reduce the difficulty of the coupling/uncoupling process due to the excessive friction.

Figure 11:
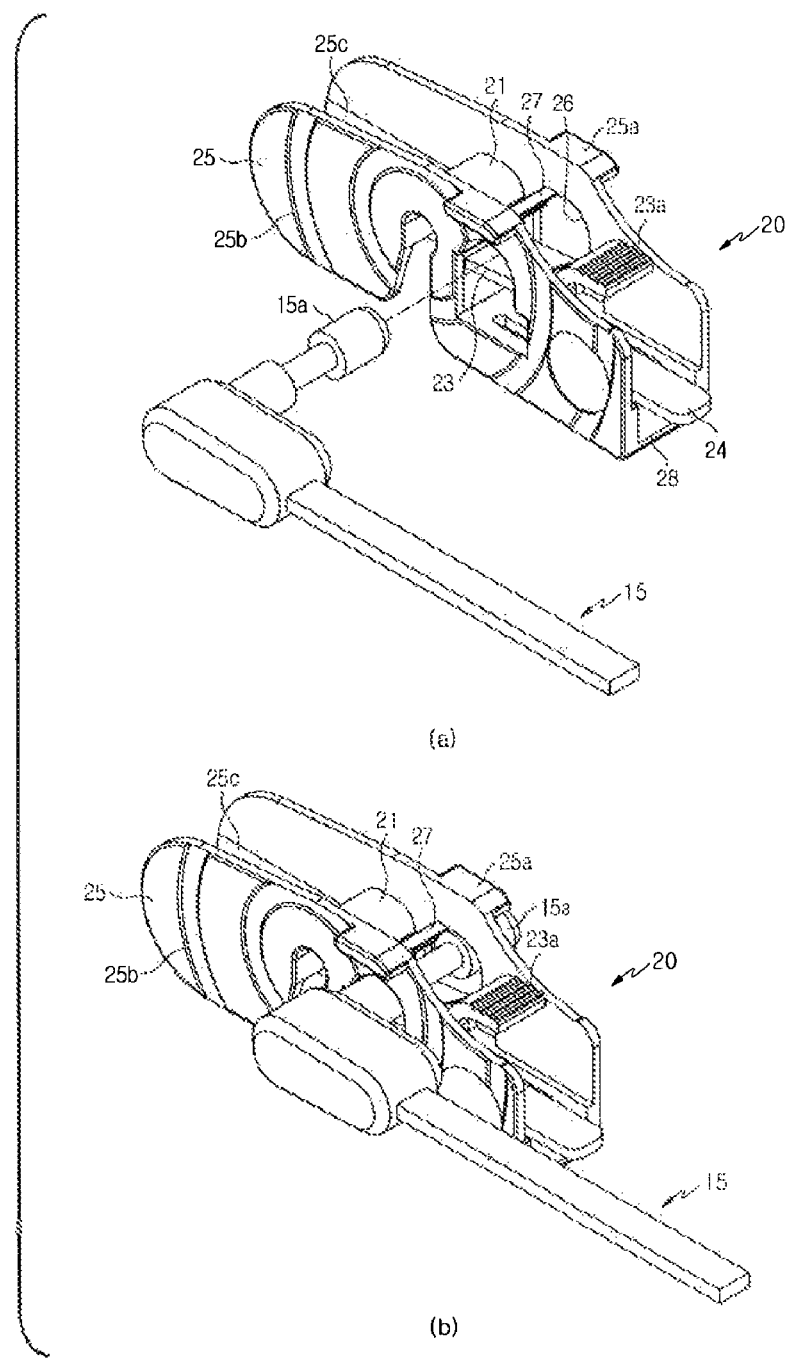
FIG. 11 is a view illustrating a state where an adaptor of a wiper blade according to one embodiment is coupled to a side pin type wiper arm, in which (a) is a perspective view showing an uncoupled state and (b) is a perspective view showing a coupled state.
Figure 12:
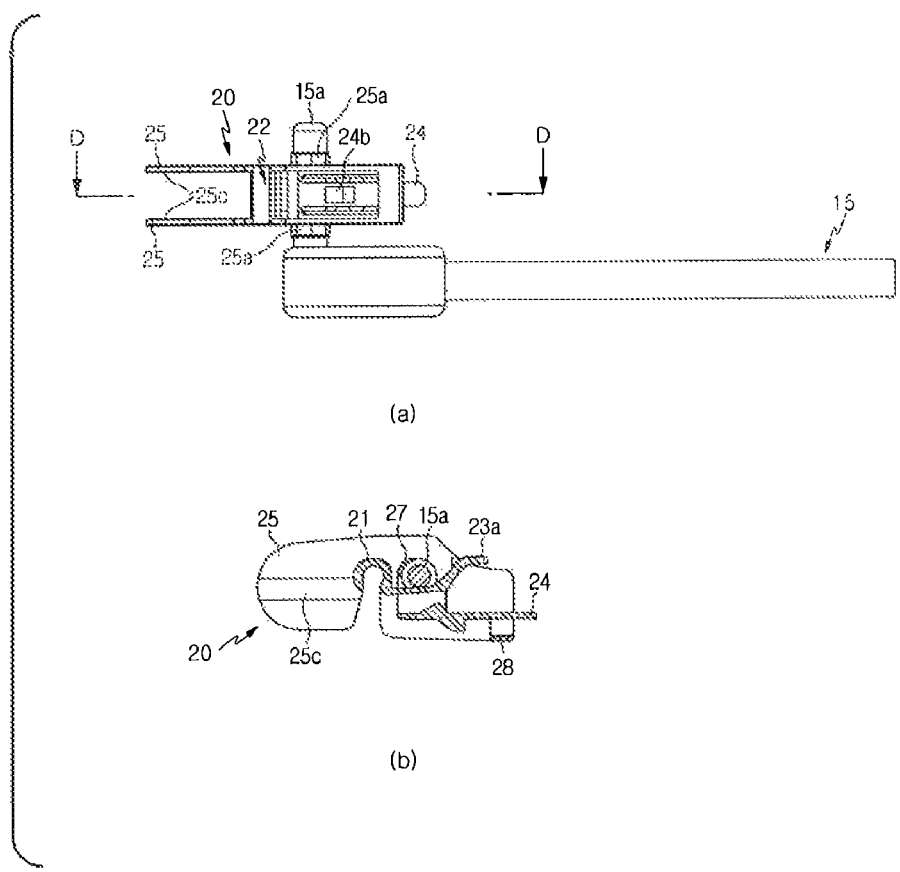
FIG. 12 is a view illustrating a state where an adaptor of a wiper blade according to one embodiment is coupled to a side pin type wiper arm, in which (a) is a bottom view showing a coupled state and (b) is a sectional view taken along line D-D in FIG. 12(*a*)

FIGS. 11 and 12 are views illustrating a state where an adaptor of a wiper blade according to one embodiment is coupled to a side pin type wiper arm. As indicated by a dotted line in FIG. 11 (a), the side pin type wiper arm 15 is moved in a direction perpendicular to the adaptor and a side pin 15a is then inserted into the through holes 26 of the adaptor, so that the side pin type wiper arm can be coupled to the adaptor in a state shown in FIG. 11 (b).

As shown in FIG. 12, when the side pin type wiper arm 15 is coupled to the adaptor including only the base member 20 without the cover member 30, the side pin 15a can be inserted through the through holes 26 formed in the base sidewalls 25 of the base member 20 and then supported by the first support 23 formed integrally on the base body 21, so that the wiper arm 15 can be maintained at a fixed state thereof.

The first support 23 is elastically deformed downwardly as viewed from FIG. 12 (b) such that a space through which the side pin 15 can pass is ensured when the side pin 15a is inserted. After the side pin 15a has been completely inserted into the through holes 26, a force by which the first support 23 is elastically deformed downwardly is removed to allow a top surface of the first support 23 to come into contact with an outer circumferential surface of the side pin 15a such that the first support 23 can press the side pin 15a.

As described above, the first support 23 is elastically deformed downward when coupled to the side pin 15a, and then presses the side pin 15a upwardly. Thus, the coupling state can be maintained. In one embodiment, a portion where the side pin 15a and the first support 23 are brought into contact with each other are concave for maintaining the side pin 15a more firmly and stably.

Figure 13:
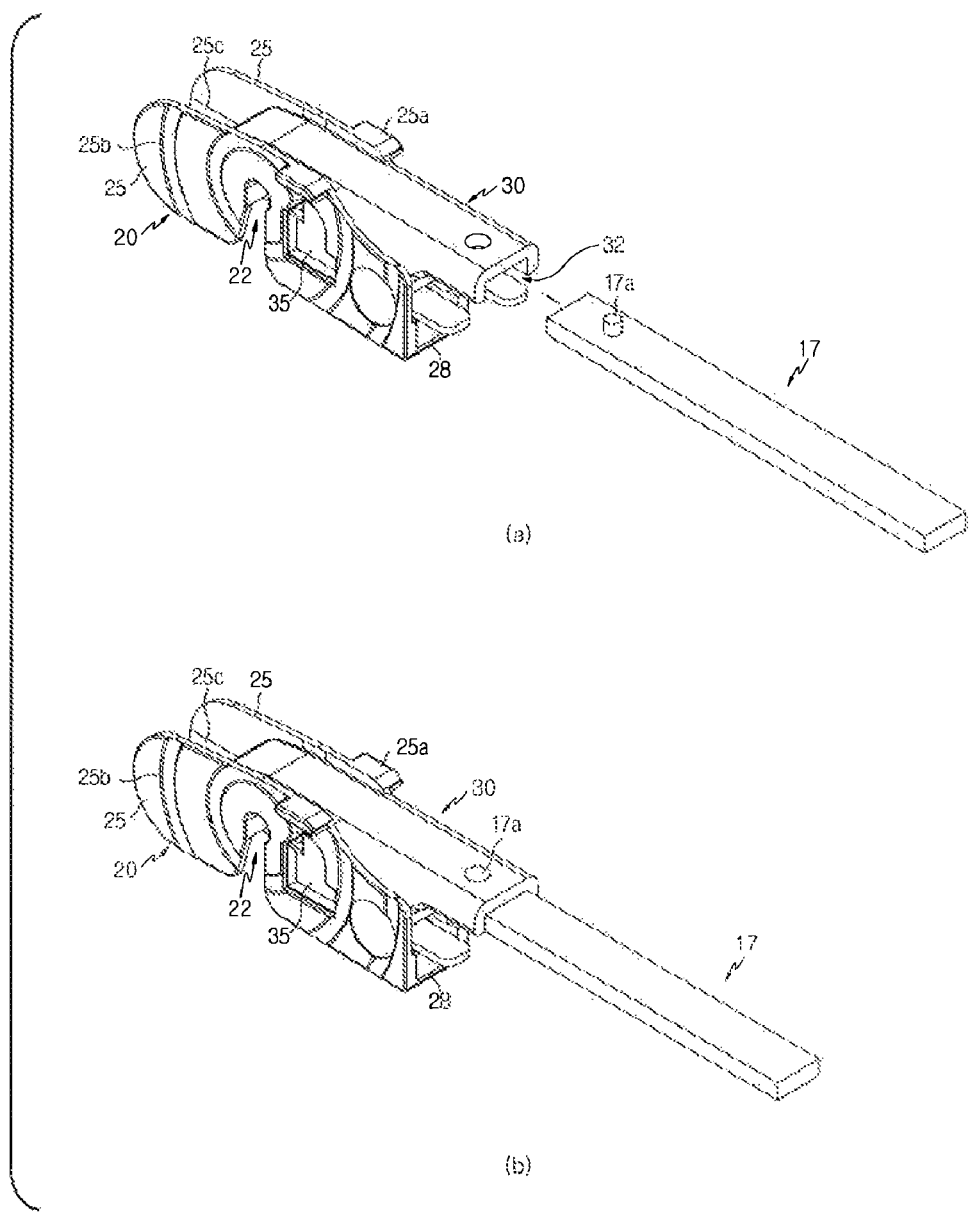
FIG. 13 is a view illustrating a state where an adaptor of a wiper blade according to one embodiment is coupled to a bayonet type wiper arm, in which (a) is a perspective view showing an uncoupled state and (b) is a perspective view showing a coupled state.
Figure 14:
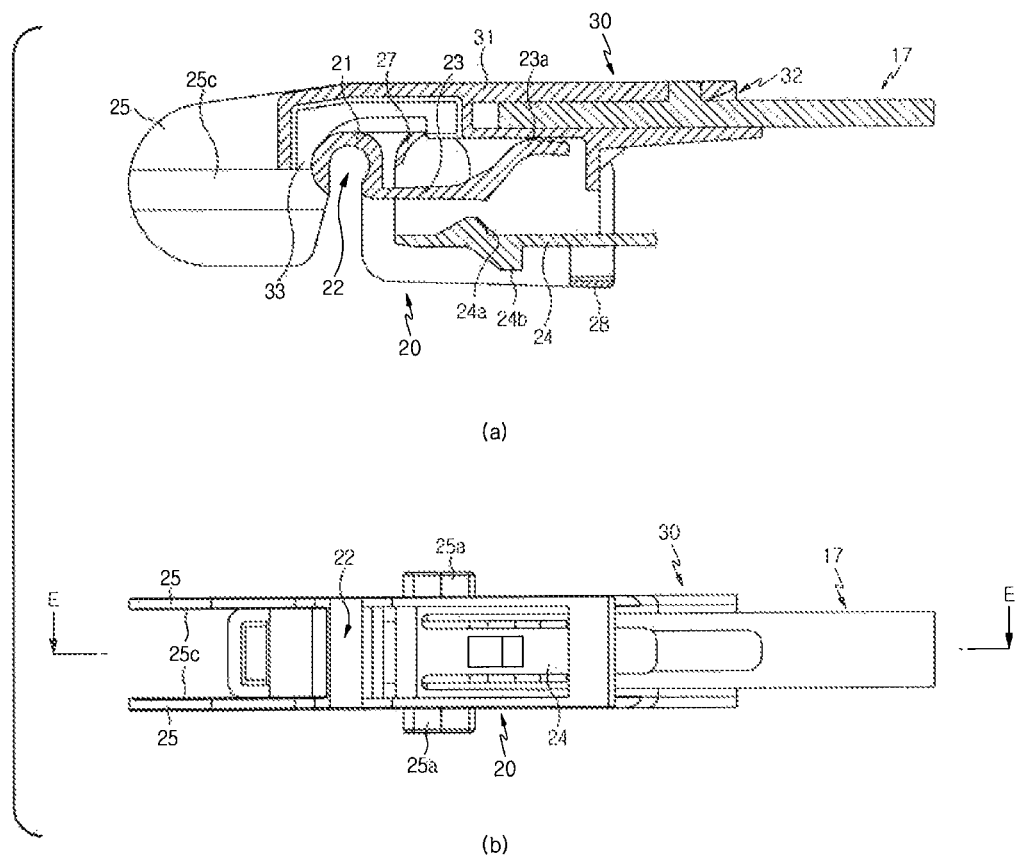
FIG. 14 is a view illustrating a state where an adaptor of a wiper blade according to one embodiment is coupled to a bayonet type wiper arm, in which (a) is a sectional view taken along line E-E in FIG. 14(*b*) and (b) is a bottom view showing a coupled state.

FIGS. 13 and 14 are views illustrating a state where an adaptor of a wiper blade according to one embodiment is coupled to a bayonet type wiper arm. As indicated by a dotted line in FIG. 13 (a), the bayonet type wiper arm 17 can be moved in a direction parallel with the adaptor and then coupled to the adaptor in a state as shown in FIG. 13 (b).

As shown in FIG. 14, when the bayonet type wiper arm 17 is coupled to the adaptor including both the cover member 30 and the base member 20, at least a portion of the wiper arm 17 is inserted into the insertion groove portion 32 of the cover member 30, so that the wiper arm 17 can be maintained at a fixed state.

In particular, since a projection 17a formed on the bayonet type wiper arm 17 is inserted into a coupling hole 32a (see FIG. 6) formed in the insertion groove portion 32, the bayonet type wiper arm 17 can be further firmly fixed to the adaptor.

Accordingly, an adaptor according to these and other embodiments provide an improved structure that can be easily coupled to a wiper arm when the wiper blade is replaced with a new one and can also be coupled to the wiper arms having a variety of shapes and sizes.

Although the present invention has been illustrated and described in connection with the accompanying drawings and embodiments, the present invention is not limited thereto and is defined by the appended claims. Therefore, it will be understood by those skilled in the art that various modifications and changes can be made thereto without departing from the spirit and scope of the invention defined by the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An adaptor configured to be coupled to a bracket of a wiper blade for coupling the wiper blade to a wiper arm, comprising:
   a base body formed with a coupling groove portion to be coupled to the bracket;
   a pair of base sidewalls coupled integrally with each other by the base body, the base body including a first elastic support extending from the coupling groove portion in one direction and a second elastic support spaced apart from the first elastic support by a certain distance, and each of the pair of base sidewalls is formed with a through hole therein; and
   a cover member attachable to the adaptor, the cover member including a pair of cover sidewalls each of which is formed with a coupling protrusion to insert and couple into the through hole of a respective one of the base sidewalls of the adaptor and a cover body for integrally coupling the pair of cover sidewalls to each other.

2. The adaptor as claimed in claim 1, wherein the first elastic support includes a pressing portion which is formed on a distal end thereof and is elastically deformed to press and support the wiper arm when the pressing portion is brought into contact with the wiper arm, the second elastic support includes an upper protrusion which protrudes upwardly, and wherein an upper guide is formed between the base sidewalls to guide the coupling of the wiper blade to the wiper arm.

3. The adaptor as claimed in claim 2, wherein when a hook type wiper arm is coupled to the adaptor, a ring portion of the wiper arm is brought into contact with each of an inner surface of each of the base sidewalls, the upper guide formed integrally between the base sidewalls, the coupling groove portion formed integrally in the base body, the pressing portion of the first elastic support, and the upper protrusion of the second elastic support to maintain the wiper arm in a fixed state relative to the adaptor.

4. The adaptor as claimed in claim 1, wherein the first elastic support includes a pressing portion which is formed on a distal end thereof and is elastically deformed to press and support the wiper arm when the pressing portion is brought into contact with the wiper arm, the second elastic support includes a lower protrusion which protrudes downwardly, and wherein an upper guide is formed between the base sidewalls to guide the coupling of the wiper blade to the wiper arm.

5. The adaptor as claimed in claim 4, wherein when a hook type wiper arm is coupled to the adaptor, a ring portion of the wiper arm is brought into contact with each of an inner surface of each of the base sidewalls, the upper guide formed integrally between the base sidewalls, the coupling groove portion formed integrally in the base body, the pressing portion of the first elastic support, and the lower protrusion of the second elastic support to maintain the wiper arm in a fixed state relative to the adaptor.

6. The adaptor as claimed in claim 1, wherein when a side pin type wiper arm is coupled to the adaptor, a side pin is inserted through the through holes formed in the base sidewalls and is then elastically supported by the first elastic support formed integrally on the base body.

7. The adaptor as claimed in claim 1, wherein the base body includes a lower guide formed toward a distal end of the adaptor between the base sidewalls at a position spaced downwardly from the second elastic support by a certain distance.

8. The adaptor as claimed in claim 1, wherein each base sidewall includes a bulged portion which is gently bulged from an inner surface thereof.

9. The adaptor as claimed in claim 1, wherein each base sidewall includes a protrusion protruding from an outer surface thereof at an upper end of the outer surface to restrict a rotating range of the wiper blade.

10. The adaptor as claimed in claim 1, wherein each base sidewall includes a plurality of circular protrusions formed on an outer surface thereof in a concentric circular pattern around the coupling groove portion.

11. The adaptor as claimed in claim 1, wherein the cover body includes an insertion groove portion open in one direction and a hooking portion extending to the other direction to be hooked to an outer periphery of the coupling groove portion of the adaptor, and the cover member is coupled to the adaptor in a state where the coupling protrusion formed on each of the cover sidewalls is inserted into the through hole of a respective one of the base sidewalls, the hooking portion of the cover body is hooked to the outer periphery of the coupling groove portion, and the insertion groove portion of the cover body presses and elastically deforms the first elastic support.

12. The adaptor as claimed in claim 11, wherein when a bayonet type wiper arm is coupled to the adaptor with the cover member installed thereto, the wiper arm is inserted into the insertion groove portion and is maintained at a fixed state.

13. An adaptor coupled to a bracket of a wiper blade for coupling the wiper blade to a wiper arm, comprising:
a base member coupled to the wiper blade; and
a cover member mounted to the base member,
wherein the base member includes a base body formed with a coupling groove portion to be coupled with the bracket and having a first elastic support extending from the coupling groove portion in one direction, and a pair of base sidewalls coupled with each other by the base body and each having a through hole, and
the cover member includes a pair of cover sidewalls each of which is formed with a coupling protrusion inserted and coupled into the through hole formed on the base sidewall of the adaptor, and a cover body for integrally coupling the pair of cover sidewalls to each other.

14. The adaptor as claimed in claim 13, wherein the first support includes a pressing portion which is formed toward a distal end thereof and is elastically deformed to press and support the wiper arm when the pressing portion is brought into contact with the wiper arm.

15. The adaptor as claimed in claim 13, wherein the base sidewall includes an upper guide formed along a portion of an outer periphery of the through hole to guide the coupling of the cover body to the base member.

16. The adaptor as claimed in claim 13, wherein the cover body includes an insertion groove portion open in one direction to receive the wiper arm therein and a hooking portion hooked to an outer periphery of the coupling groove portion of the base body.

17. The adaptor as claimed in claim 13, wherein the base sidewall includes a bulged portion which is gently bulged from an inner surface thereof.

18. The adaptor as claimed in claim 13, wherein the base sidewall includes a protrusion protruding from an outer surface thereof at an upper end of the outer surface to restrict a rotating range of the wiper blade.

19. The adaptor as claimed in claim 13, wherein the base sidewall includes a plurality of circular protrusions formed on an outer surface thereof in a concentric circular pattern around the coupling groove portion.

* * * * *